No. 829,407. PATENTED AUG. 28, 1906.
W. H. LONG.
NUT LOCK.
APPLICATION FILED MAR. 6, 1906.
Fig. 1.
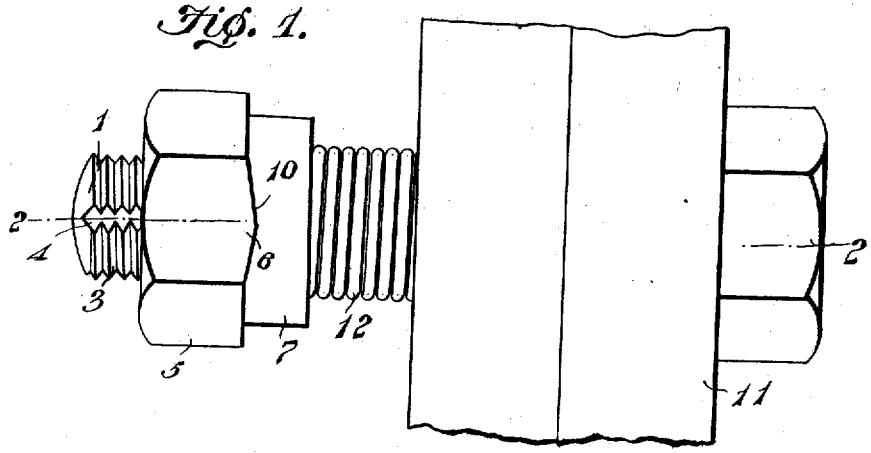
Fig. 2.
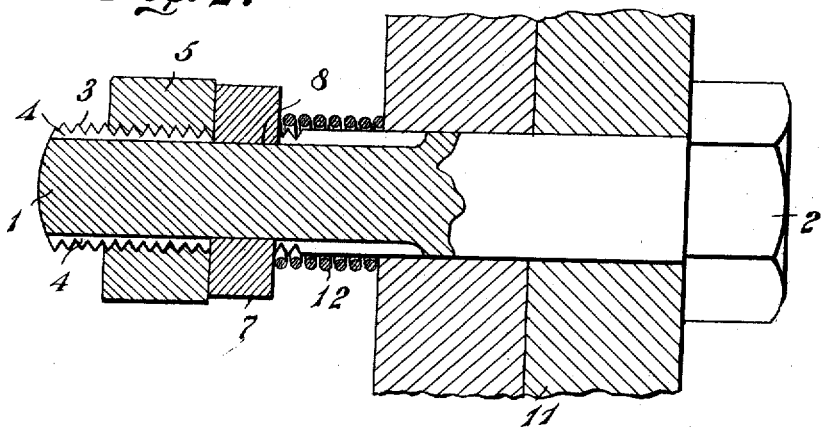
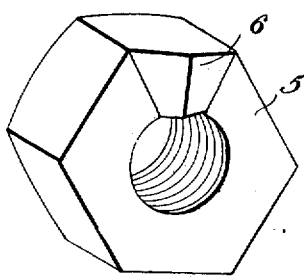
Fig. 3.
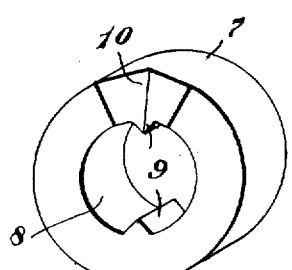
Fig. 4. Fig. 5.
WITNESSES:
E. F. Stewart
H. A. Shepard
William H. Long
INVENTOR
By C. A. Snow & Co.
ATTORNEYS

UNITED STATES PATENT OFFICE.

WILLIAM H. LONG, OF HOWARD, PENNSYLVANIA.

NUT-LOCK.

No. 829,407.     Specification of Letters Patent.     Patented Aug. 28, 1906.

Application filed March 6, 1906. Serial No. 304,600.

*To all whom it may concern:*

Be it known that I, WILLIAM H. LONG, a citizen of the United States, residing at Howard, in the county of Center and State of Pennsylvania, have invented a new and useful Nut-Lock, of which the following is a specification.

This invention relates to nut-locks, and is primarily designed to provide for locking ordinary nuts in a simple and improved manner without materially altering the nuts and also to enable the convenient release of the nut no matter how firmly the latter has been tightened. It is also proposed to enable the repeated use of the nut without damage to the latter and the bolt, thereby prolonging the lives of these members.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

In the drawings, Figure 1 is a side elevation of a bolt and nut equipped with the locking device of the present invention. Fig. 2 is a sectional view on the line 2 2 of Fig. 1. Fig. 3 is a detail view of the nut. Fig. 4 is a detail view of the washer. Fig. 5 is a view similar to Fig. 4, showing the washer provided with a plurality of locking depressions.

Like characters of reference designate corresponding parts in all of the figures of the drawings.

The present invention includes an ordinary bolt 1, having one end provided with any conventional form of head 2 and its other end portion threaded, as at 3. In addition to these conventional features the threaded portion of the bolt is intersected by diametrically opposite longitudinal grooves or channels 4, opening through the threaded extremity of the bolt. The nut 5 is of conventional form and in addition is provided upon its rear face with a shallow boss or projection 6, which is tapered or beveled from its opposite ends outwardly from the nut and intersect in a straight edge which is radial with respect to the bolt-opening. For the purpose of locking the nut there is a locking-washer 7, having a smooth bolt-opening 8, from the walls of which extend diametrically opposite projections 9 of a size and shape to slidably fit in the grooves 4 of the bolt, whereby the washer may be slid along upon the bolt under the tightening influence of the nut. That face of the washer which is adjacent the nut is provided with a shallow depression 10, approximating the size and shape of the boss or projection 6 of the nut, so as to receive the same in the locked condition of the nut. After the bolt has been thrust through a piece of work, such as shown at 11, a helical spring 12 is placed upon the threaded end of the bolt against the work. The washer 7 is then fitted to the bolt and slid up against the spring, after which the nut is applied and tightened to the desired degree. During the tightening of the nut the boss or projection 6 will wipe across the washer and the latter will yield against the advancing movement of the nut until the latter has been properly tightened, with its boss received in the seat or depression 10. As the washer is locked against rotation by means of its projections 9 fitting in the grooves 4 of the bolt and the nut is interlocked with the washer by reason of its boss 6 being received within the depression 10 of the washer, said nut is locked against accidental rotation and consequent looseness. To release the nut, it is forcibly turned in a direction to unscrew the same, and as the projection 6 wipes across one beveled or inclined wall of the depression the washer will be forced toward the work, so as to enable the boss working out of the depression 10, whereby the nut can be readily loosened and finally removed.

A very important feature of the present invention resides in the shape and shallowness of the locking projection 6 and the complementary seat 10, whereby only a slight yielding of the washer is necessary to enable loosening of the nut, and as the nut cannot be tightened to such an extent that the spring 12 cannot be further compressed it is always possible to readily release the nut by a forcible unscrewing thereof. It will also be noted that there is no injury done to the nut, the washer, the bolt, nor the work, wherefore the several elements may be repeatedly used to good advantage.

The internal ribs in Figs. 4 and 5 of the drawings preferably are located at the inner ends of the deepest portions of the seats 10.

so as to strengthen the washers 7 at the points where they are weakened by said depressions or seats 10.

Having thus described the invention, what is claimed is—

A nut-lock comprising a bolt having a pair of diametrically opposite longitudinal grooves intersecting its threaded portion, a non-rotatable washer having a pair of internal ribs for engagement with the grooves and provided in its outer face with a shallow seat formed with flat inclined walls, one of said internal ribs being located at the inner end of the deepest portion of said seat to strengthen the washer at that point, a nut having a shallow boss or projection formed with flat beveled faces to engage the seat of the washer and interlock these members, and a helical spring embracing the bolt in the rear of the washer to yieldably force the latter against the nut.

In testimony that I claim the foregoing as my own I have hereto affixed my signature in the presence of two witnesses.

WILLIAM H. LONG.

Witnesses:
J. ROSS COLHOUN,
C. E. BOYLE.